(12) United States Patent
Pouli et al.

(10) Patent No.: US 9,648,251 B2
(45) Date of Patent: May 9, 2017

(54) METHOD FOR GENERATING AN HDR IMAGE OF A SCENE BASED ON A TRADEOFF BETWEEN BRIGHTNESS DISTRIBUTION AND MOTION

(71) Applicant: THOMSON LICENSING, Issy les Moulineaux (FR)

(72) Inventors: Foteini Tania Pouli, Cesson Sevigne (FR); Erik Reinhard, Cesson Sevigne (FR); Yulia Gryaditskaya, Saarbrücken (DE)

(73) Assignee: Thomson Licensing (FR)

( * ) Notice: Subject to any disclaimer, the term of this patent is extended or adjusted under 35 U.S.C. 154(b) by 0 days.

(21) Appl. No.: 15/001,121

(22) Filed: Jan. 19, 2016

(65) Prior Publication Data

US 2016/0212355 A1 Jul. 21, 2016

(30) Foreign Application Priority Data

Jan. 19, 2015 (EP) .................................... 15305054

(51) Int. Cl.
*H04N 5/228* (2006.01)
*H04N 5/265* (2006.01)
(Continued)

(52) U.S. Cl.
CPC ............ *H04N 5/265* (2013.01); *G06T 5/007* (2013.01); *G06T 7/20* (2013.01); *H04N 5/235* (2013.01);
(Continued)

(58) Field of Classification Search
CPC .................................................. H04N 5/2355
See application file for complete search history.

(56) References Cited

U.S. PATENT DOCUMENTS 6,720,993 B1 * 4/2004 Hwang ................ H04N 5/2355
348/208.13
7,382,931 B2 6/2008 Kang et al.
(Continued)

FOREIGN PATENT DOCUMENTS

WO WO2006070046 7/2006

OTHER PUBLICATIONS

Burker etal—"Exposure control for HDR video"—Proceedings of the SPIE—The International Society for Optical Engineering, vol. 9138 (12 pp)—May 15, 2014.
(Continued)

*Primary Examiner* — Gary C Vieaux
(74) *Attorney, Agent, or Firm* — Jack Schwartz & Associates, PLLC (57) ABSTRACT

The present invention relates in general to a method of high dynamic range (HDR) digital imaging and determining and setting exposure parameters for detection of image data by an imaging device, such as a digital camera, to produce a high dynamic range (HDR) image of a scene. The method includes setting an exposure ($E_{i+1}$) for a next frame ($f_{i+1}$) as a function of the current exposure ($E_i$), of a first brightness distribution ($Hfull_i$) of colors of pixels of the current frame ($f_i$) and of a second brightness distribution ($Hmotion_i$) of colors of those pixels weighted by the motion of those pixels, such that motion is evaluated for those pixels in comparison with a previous frame ($f_i$), capturing the next frame ($f_{i+1}$) under the set exposure ($E_{i+1}$) and merging the next frame ($f_{i+1}$) with at least the current frame ($f_i$) into an HDR image.

8 Claims, 5 Drawing Sheets

(51) Int. Cl.
*H04N 5/50* (2006.01)
*H04N 5/235* (2006.01)
*G06T 5/00* (2006.01)
*G06T 7/20* (2017.01)

(52) U.S. Cl.
CPC ............ *H04N 5/2355* (2013.01); *H04N 5/50* (2013.01); *G06T 2207/10016* (2013.01); *G06T 2207/20208* (2013.01)

(56) References Cited

U.S. PATENT DOCUMENTS

| | | | |
|---|---|---|---|
| 8,582,001 | B2 | 11/2013 | Tzur et al. |
| 8,760,528 | B2 | 6/2014 | Mori |
| 2012/0249844 | A1 | 10/2012 | Saito et al. |
| 2013/0070965 | A1* | 3/2013 | Jang ................... G06K 9/60 382/103 |
| 2013/0235232 | A1 | 9/2013 | Yang et al. |
| 2015/0009355 | A1 | 1/2015 | Peng |

OTHER PUBLICATIONS

Gupta etal—"Fibonacci Exposure Bracketing for High Dynamic Range Imaging"—IEEE International Conference on Computer Vision (ICCV), Dec. 2013.

Guthier etal—"Algorithms for a real-time HDR video system"—Journal Pattern Recognition Letters—Elsevier Science BV—vol. 34, Issue 1, pp. 25-33, Jan. 2013.

Guthier etal—"A Real-Time System for Capturing HDR Videos"—proc of 20th ACM International Conference on Multimedia, MM'12, pp. 1473-1476—Oct. 29-Nov. 2, 2012, Nara, Japan.

Debevec etal—"Recovering High Dynamic Range Radiance Maps from Photographs"—SIGGRAPH '97: Proceedings of the 24th annual Conference on Computer Graphics and Interactive Techniques, pp. 369-378, New York, NY, USA, Aug. 3-8, 1997—ACM.

Gallo etal—"Metering for Exposure Stacks"—Journal Computer Graphics Forum, John Wiley & Sons, Inc, vol. 31, Issue 2, pp. 479-488, May 2012.

Horn etal—"Determining optical flow"—Proc. SPIE 0281, Techniques and Applications of Image Understanding, Nov. 12, 1981.

Kalantari etal—"Patch-Based High Dynamic Range Video"—Journal ACM Transactions on Graphics (TOG)—Proceedings of ACM SIGGRAPH Asia 2013—vol. 32 Issue 6, Nov. 2013.

Kang etal—"High Dynamic Range Video"—ACM Transactions on Graphics (TOG)—Proceedings of ACM SIGGRAPH 2003, vol. 22 Issue 3, Jul. 2003.

Kiser etal—"Real-Time automated tone mapping system for HDR video"—IEEE International Conference on Image Processing, ICIP 2012, Sep. 30-Oct. 3, 2012.

Mitsunaga etal—"Radiometric Self Calibration"—Proceedings of the IEEE Conference on Computer Vision and Pattern Recognition, 1999, vol. 1, pp. 374-380, Jun. 23, 1999-Jun. 25, 1999.

Nayar etal—"High dynamic range imaging: spatially varying pixel exposures"—Proceedings. IEEE Conference on Computer Vision and Pattern Recognition, 2000, vol. 1, pp. 472-479. Jun. 13, 2000-Jun. 15, 2000.

Reinhard etal—"Calibrated Image Appearance Reproduction"—ACN Transactions on Graphics (TOG)—Proceedings of ACM SIGGRAPH Asia 2012—vol. 31 Issue 6, Nov. 2012.

Sen etal—"Robust Patch-Based HDR Reconstruction of Dynamic Scenes"—ACM Transactions on Graphics (TOG)—Proceedings of ACM SIGGRAPH Asia 2012, vol. 31, Issue 6, Nov. 2012.

Tocci etal—"A Versatile HDR Video Production System"—ACM Transactions on Graphics (TOG)—Proceedings of ACM SIGGRAPH 2011, vol. 30 Issue 4, Jul. 2011.

Castro etal.—"Towards Mobile HDR Video"—Dec. 31, 2011 (Dec. 31, 2011)—XP055199089—DOI: 10.2312/EG2011/areas/075-076—Retrieved from the Internet: URL:http://dx.doi.org/10.2312/EG2011/areas/075-076 [retrieved on Jun. 6, 2015]—the whole document.

Urban etal—"HDS, a real-time multi-DSP motion estimator for MPEG-4H.264 AVC high definition video encoding", Mar. 2009, Journal of Real-Time Image Processing, vol. 4, Issue 1, pp. 23-31.

* cited by examiner

METHOD FOR GENERATING AN HDR IMAGE OF A SCENE BASED ON A TRADEOFF BETWEEN BRIGHTNESS DISTRIBUTION AND MOTION

This application claims the benefit, under 35 U.S.C. §119 of European Patent Application No. 15305054.7, filed Jan. 19, 2015.

TECHNICAL FIELD

The present invention relates in general to high dynamic range (HDR) digital imaging and in particular to determining and setting exposure parameters for detection of image data by an imaging device, such as a digital camera, to produce a high dynamic range (HDR) image of a scene.

BACKGROUND ART

Dynamic range is the ratio between the largest and smallest possible signals a sensor or an actuator can generate. As used herein, the term "dynamic range" refers to the dynamic range of an image capture device, such as a digital camera.

To capture HDR images of a scene, multiple frames of this scene are generally captured by a HDR image capture device under varying exposures. In a traditional setup of this device, the exposures are generally spaced such as to cover the full distribution of illumination in the scene. Such a process is known as "exposure bracketing". Modern cameras allow the capture of 3 to 9 exposure brackets, which may be spaced ⅓ f-stop to 3 f-stops apart, where 1 f-stop is one logarithmic unit. F-stop is the ratio of the focal length of the camera lens to the diameter of the entrance pupil of this lens. To create an HDR image from these frames having different exposures, the sequence of exposures is merged by combining in a manner known per se the well exposed parts of each exposure. In general, exposures are scaled according to their exposure time and each pixel of each frame receives a weight factor depending on its light intensity—pixels closer to the middle of the range receive higher weight as they are more likely to depict useful information. See for instance: Pradeep Sen, Nima Khademi Kalantari, Maziar Yaesoubi, Soheil Darabi, Dan B. Goldman, and Eli Shechtman. Robust patch-based HDR reconstruction of dynamic scenes. *ACM Transactions on Graphics*, 31(6): 203:1-203:11, 2012.

Typically, exposures of the different frames used to build an HDR image are evenly spaced. Because of the even spacing of the exposures, these solutions have a number of weaknesses. First, too many exposures may be captured, each replicating a lot of the content of adjacent exposures. Second, if exposures are spaced further away, the resulting HDR image may suffer from too much noise in dark areas.

In the article entitled "Metering for exposure stacks", published in 2012 by Orazio Gallo et al. in *Computer Graphics Forum*, volume 31, pages 479-488 (Wiley Online Library), before capturing the set of exposures used to build an HDR image, an algorithm estimates the HDR histogram of the scene using low resolution exposures. Based on this histogram, all combinations of exposures are tested to decide which is optimal for the scene to HDR capture. To guide the selection and placement of exposures, noise characteristics are also taken into account so that the final selection minimizes noise. Then the series of exposures is captured with these settings. Since this approach is designed for capturing a single HDR image it has the following disadvantages:

No motion is considered;

It is not practical for video as it requires the full HDR histogram to be built. This would cause too many lost frames and therefore the final result would be low frame rate.

The same conclusions apply to the document U.S. Pat. No. 7,382,931 and U.S. Pat. No. 8,582,001.

When applying such a HDR process to video capture, alternating frames are captured successively using different exposure settings: such a process is called "temporal bracketing". But, as some objects in the scene may move during the capture of the successive exposures used to build each HDR image of the video (or the camera may move) and as these different exposures capture the scene at different times, the merging of these exposures may create motion artefacts. Moreover, as the frequency of HDR images is a division of the frame frequency allowed by the video image capture device, this HDR frequency may be too low to avoid motion blurring.

Therefore, there is a need for a tradeoff between high dynamic range and sharp motion capture.

SUMMARY OF INVENTION

An object of the invention is such a tradeoff.

A subject of the invention is a method for generating an HDR image of a scene, wherein a current frame imaging said scene has been captured under a current exposure and a previous frame imaging said scene has been captured before said current frame, said method comprising:

setting an exposure for a next frame as a function of said current exposure, of a first brightness distribution of colors of pixels of said current frame and of a second brightness distribution of colors of these pixels weighted by the motion of these pixels, wherein said motion is evaluated for these pixels in comparison with said previous frame, capturing said next frame under said set exposure, merging said next frame with at least said current frame into an HDR image.

Each of said frames, i.e. previous, current and next frames, images said scene at different instants. These previous, current and next frames may be frames that are captured successively, i.e. with no other frame(s) between them, or may be frames that are not captured successively, i.e. with other frame(s) between them.

Said motion region may concern different parts of said current frame that are not joined together. The evaluation of this motion for these pixels may also take into account other parameters in complement to the comparison with the previous frame.

In order to determine on the fly the optimal exposure settings of the different frames to be merged to get HDR images of a scene, the proposed image/frame capture method considers advantageously both the dynamic range of this scene and motion in this scene. The method dynamically changes the exposure from frame to frame, not only in function of the distribution of brightness values in the scene as in the prior art, but also in function of motion detected in this scene. This method makes advantageously use of local and global motion data together with the luminance histogram information to decide how many exposures are possible for a given scene without creating motion artefacts.

Instead of using predefined parameters to define exposures of successive frames used to generate an HDR image, the method defines an exposure for a next frame immediately after capturing a current frame.

As a secondary benefit, the method does not reduce the frame rate since the number of HDR images generated in a sequence will be almost the same as the number of frames used for the generation of these HDR images. For instance, if the scene has two distinct areas with very different brightness levels, the method will align exposures with the each of these levels but will space out exposures further so that overlap between them is minimized or removed, depending also on which merging algorithm is applied for the post-processing. Likewise, if a shaded object is moving in front of a bright background (or vice versa), the exposures will be spaced around the intensity level of the moving object so that its motion can be adequately captured. In the bright background areas (or vice versa), the method will rely on the more spatially distant frames, where the motion in dark (bright) areas was not strong and allowed to capture the dynamic range of the full scene. Thus while giving the priority to the region with motion, the method may advantageously reconstruct for each generated LDR image the full scene range if in one of neighboring frames the motion decreased. If not, the method still expands the range in comparison with a single LDR image.

Preferably, said motion is null for at least one pixel of the current frame. It means that this frame comprises actually a non-motion region. More generally, it means that the evaluation of motion for pixels of the current frame in comparison with corresponding pixels in the previous frame leads to different values of motion, notably of motion amplitude, including notably zero.

Preferably, said exposure for the next frame is set as a function also of a preferred direction of exposure change for said current frame.

Preferably, said method comprises the determination of a preferred direction of exposure change for a frame following the next frame.

Preferably, said setting of an exposure for the next frame comprises an estimation of an initial exposure based on said first brightness distribution but not based on said second brightness distribution, an estimation of an adjusted exposure based on said second brightness distribution, and a final estimation of said exposure for the next frame adapted to choose between said initial exposure and said adjusted exposure as a value for said exposure for the next frame.

A subject of the invention is also an HDR image capture device comprising a frame sensor configured to capture successive frames imaging a scene, notably to capture a current frame under a current exposure and a previous frame, and a processor configured to:

set an exposure for a next frame as a function of said current exposure, of a first brightness distribution of colors of pixels of said current frame and of a second brightness distribution of colors of those pixels weighted by the motion of those pixels, wherein said motion is evaluated for those pixels in comparison with said previous frame, trigger the capture of said next frame under said set exposure by said frame sensor, merge said next frame with at least said current frame into an HDR image.

BRIEF DESCRIPTION OF DRAWINGS

The invention will be more clearly understood on reading the description which follows, given by way of non-limiting example and with reference to the appended figures in which.

DESCRIPTION OF EMBODIMENTS

It will be appreciated by those skilled in the art that flow charts, diagrams, and the like presented herein represent conceptual views of illustrative circuitry embodying the invention. They may be substantially represented in computer readable media and so executed by a computer or processor, whether or not such computer or processor is explicitly shown.

Figure 1:
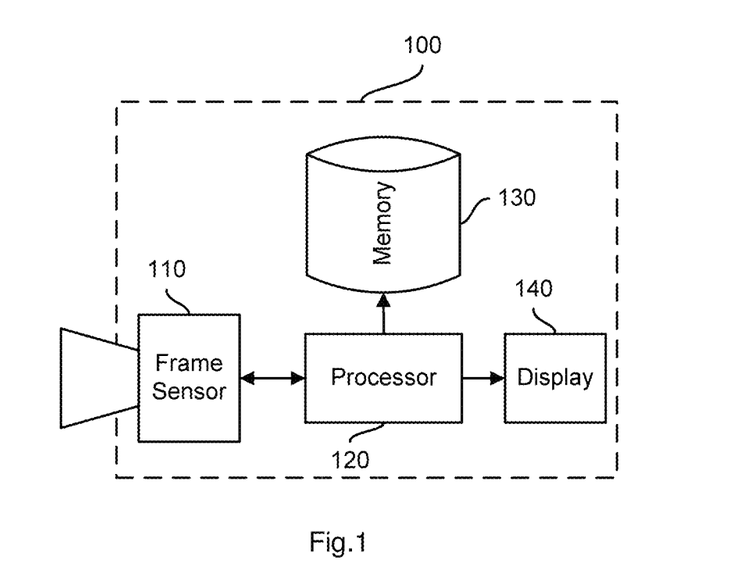
FIG. 1 is a simplified block diagram of a video image capture device according to a main embodiment of the invention.

According to a main embodiment of the invention, FIG. 1 depicts a simplified block diagram of a video image capture device, and more particularly a digital video camera. Digital video camera 100 includes a frame sensor 110. Frame sensor 110 may relate to a combination of an optical lens and light detection circuitry (e.g., CMOS integrated circuit, etc.) configured to capture an image or a frame of a scene. This frame sensor 110 is characterized in a manner known per se by a camera response function ("CRF"), which takes brightness value and returns brightness value. This CRF can be thought of as an inverse gamma. Its role is to linearize the image against the non-linearity of the sensor.

Image data detected by frame sensor 110 may be provided to processor 120 as captured frame data via a bus. Captured frame data includes color data related to the different pixels of a frame.

Processor 120 may be implemented using one of an integrated circuit microprocessor, microcontroller, digital signal processor and processor in general. Processor 120 may be configured to process received frame data based on, for example, specific image processing algorithms stored in memory 130 in the form of processor-executable instructions. Processor 120 is further configured to provide exposure values to frame sensor 110 by way of a bus, such as to allow this frame sensor 110 to capture frames under such exposure values.

Processed data such as HDR image data generated by processor 120 may be stored in memory 130 and/or provided to display 140 for viewing. It should be appreciated that memory 130 may relate to any combination of different memory storage devices, such as a hard drive, random access memory (RAM), read only memory (ROM), flash memory, or any other type of volatile and/or nonvolatile memory. It should further be appreciated that memory 130 may be implemented as multiple or discrete memories for storing processed image data, as well as the processor-executable instructions for processing the captured image data. Further, memory 130 may include to removable memory, such as flash memory, for storage of image data.

Display 140 may relate to a liquid crystal display (LCD) incorporated into digital camera 100 for display of captured image data, and HDR image data. Alternatively, it should be appreciated that an external display device may be coupled to digital camera 100 for display and/or output of HDR image data. Although FIG. 1 has been described above with respect to a digital camera, it should be appreciated that the device may relate to other devices, such as imaging devices in general.

Although the video image capture device of FIG. 1 has been described as a digital video camera, it should also be appreciated that this device may relate to, or be included in, other devices, such as a mobile communication device and portable communication devices in general.

Figure 2:
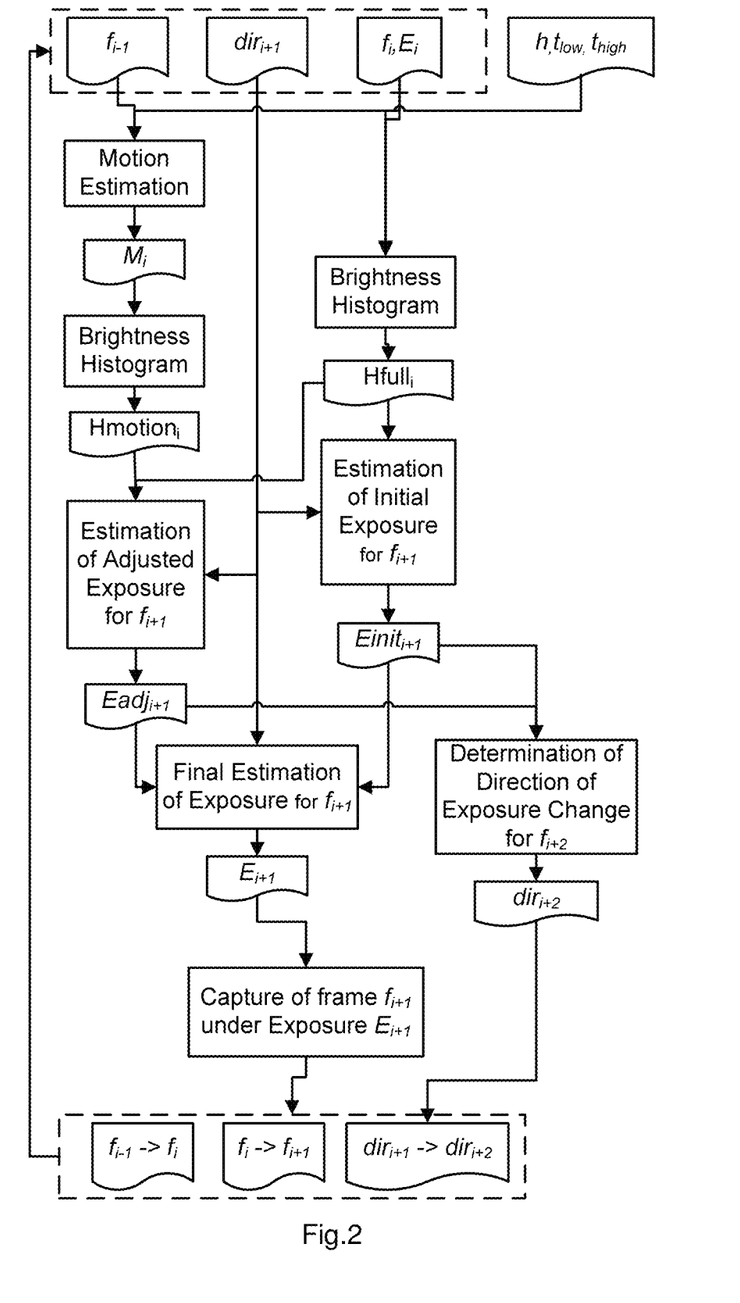
FIG. 2 is a diagram illustrating a method for generating an HDR image of a scene using the video image capture device of FIG. 1, according to a main embodiment of the invention.

Referring now to FIG. 2, a non-limiting embodiment of a method is depicted to generate at least one HDR image of a scene in a video sequence generated by the video image capture device of FIG. 1. As used herein, a "scene" may relate the area a user of this device desires to capture and may include one or more objects illuminated under various levels of illumination, wherein one or more of these objects may move during the capture of successive frames by the device. As will be discussed in more detail below, determination of the illumination range and of movements of these objects can provide one or more exposure parameters for capturing the successive frames.

In the description below, the term "over-exposed pixels" concern pixels of a captured frame for which the color data associated with those pixels correspond to a value superior to a predetermined over-exposed color data threshold $t_{high}$. When this over-exposed threshold is the maximum for the color data, the color is considered as saturated. Generally, this maximum over-exposed color data threshold is inferior to this maximum limit. Such an over-exposed threshold can be defined in each color channel R, G and B used to represent a color and R, G, and B are then considered as color data. In another example, this over-exposed color data threshold is defined as an over-exposed luminance threshold and the luminance L is computed as a weighted sum of the values of R, G and B. Still in another example that is more performance sensitive (e.g. mobile phone), we would use the green color channel as a 'proxy' for luminance. Similarly, the term "under-exposed pixels" concern pixels of a captured frame for which the color data associated with those pixels correspond to a value inferior to a predetermined under-exposed color data threshold $t_{low}$. Generally, this under-exposed color data threshold is superior to zero, although it may be equal to zero.

To initiate the method according to this non limiting embodiment, using the frame sensor 110, a first frame $f_0$ is captured under the exposure $E_0$ and a second frame $f_1$ is captured under the exposure $E_1$. The exposures $E_0$ and $E_1$ are set to different values using any known auto-exposure algorithm adapted to generate a first HDR image of the scene from the merging of these two initiating frames. As over-exposure is visually worse than under-exposure, the direction in which the exposure time for the second frame $dir_{i+1=1}$ is preferably going to change is preferably set to "down" (i.e. $E_1<E_0$), although it could be set to "up" (i.e. $E_1>E_0$) as well. This direction determines if the frame $f_{i+1=1}$ is captured with a longer ("up") or shorter ("down") exposure than the current frame. We compute the direction $dir_{i+2=2}$ in which the exposure time for the third frame $f_{i+2=2}$ is preferably going to change based on the characteristics of the first and second frames $f_0$ and $f_1$, using notably the decision trees shown on FIGS. 3 and 4. Captured first and second frames $f_0$, $f_1$ with their color data and values of their exposures $E_1$, $E_2$ and of the preferred direction of exposure change $dir_{i+2}$ for the third frame $f_2$ are then transferred for storage to the memory 130 and for processing as described below to the processor 120.

For the first iteration of the processing of the two frames below in which i=1, the second frame $f_{i=1}$ is named "current frame", the first frame $f_{i-1=0}$ "previous frame", the third frame $f_{i+1=2}$ "next frame", and a fourth frame $f_{i+2=3}$ following the "next" frame is named "following frame". Steps 1 to 6 are implemented by the processor 120. Then step 6 is implemented by the sensor 110 to capture the "next frame" $f_{i+1}$ under exposure $E_{i+1}$ computed from steps 1 to 6.

After this first iteration, a second iteration is launched with i=2. The frame $f_{i=2}$ becomes the "current frame", $f_{i-1=1}$ the "previous frame", $f_{i+1=3}$ the "next frame" and $f_{i+2=4}$ the "following frame", for another iteration of steps 1 to 6, allowing the capture of another "next frame" under exposure computed again from steps 1 to 6. And so on with increased values of i up to the end of the capture of a sequence of frames from which HDR images of the scene can then be generated as described below.

We will now describe the different steps of each of these iterations. The order of presentation does not necessarily represent of the order of performing these steps.

Step 1—Brightness Histogram Computation for the Current Frame $f_i$, not-Taking into Account the Motion:

The brightness histogram $Hfull_i$ is computed in a manner known per se from the brightness values of the colors of all pixels of the current frame $f_i$, i.e. of the last frame which has been captured. This computation does not take into account the motion of pixels.

Step 2—Computation of the Motion Field $M_i$ for the Current Frame $f_i$ and, According to a First Variant, Determination of the Motion Region $MR_i$ of the Current Frame $f_i$:

From a motion field computed in manner known per se from a movement comparison between the current frame $f_i$ and the previous frame $f_{i-1}$, a motion amplitude map $M_i$ is provided having the same size as the current frame $f_i$, where each pixel of this map $M_i$ has a motion amplitude value. The motion amplitude of a pixel denotes the distance that this pixel travels from the previous frame $f_{i-1}$ to the current frame $f_i$. The motion amplitude values are preferably normalized between 0 (no motion) and 1 (maximum motion for the current frame). This motion field is computed for instance using the motion estimation method disclosed in the article entitled "a real-time multi-dsp motion estimator for mpeg-4 h. 264 avc high definition video encoding", by Fabrice Urban et al., published in 2009 in the *Journal of Real-Time Image Processing*, 4(1), pages 23-31.

In a first variant, having fixed a motion amplitude threshold superior to zero, all pixels of this motion amplitude map $M_i$ having a motion amplitude value superior to this threshold form a motion region $MR_i$ in the current frame $f_i$. A second variant without motion amplitude threshold is presented in step 3 below.

Step 3—Brightness Histogram Computation Taking into Account the Motion for the Current Frame $f_i$:

Using preferably but not necessarily the same method as for step 1 above, a brightness histogram of the colors of pixels belonging to the motion region $MR_i$ determined in step 1 is computed, referred as $Hmotion_i$. It means that only pixels belonging to the motion region $MR_i$ are taken into account for this brightness histogram $Hmotion_i$, In the second variant in which no motion amplitude threshold is defined in step 1, brightness values of each pixel of the current frame $f_i$ are weighted by the motion amplitude of this pixel obtained from the motion amplitude map $M_i$ determined in step 1 above. After such a weighting of brightness values, a computation of brightness-weighted histogram is performed also referred as $Hmotion_i$ for this second variant.

In both variants above, the brightness distribution $Hmotion_i$ which is obtained by this computation is based on color data which are weighted by the motion of the corresponding pixels, wherein this motion is evaluated in comparison with the previous frame $f_{i-1}$. In the first variant, pixels belonging to the motion region are given a weight value of 1 as the other pixels are given a weight value of 0.

At this stage, we have two brightness histograms:

$Hfull_i$ for all pixels in the image.

$Hmotion_i$ which considers only pixels having a motion weight non null which are then considered as part of a motion region $MR_i$.

This means that pixels that are counted in $Hmotion_i$ are also counted in $Hfull_i$.

In a further variant of this embodiment, we can avoid this double counting of pixels by computing a separate histogram of all the pixels in the image that are not part of the motion region $MR_i$. This histogram will be referred to as $Hglobal_i$.

We assume that histogram $Hfull_i$ consists of $N_{full}$ bins, histogram $Hmotion_i$ consists of $N_{motion}$ bins and histogram $Hglobal_i$ consists of $N_{global}$ bins.

From each of the three histograms above $Hfull_i$, $Hmotion_i$ and $Hglobal_i$, we also calculate three other cumulative histograms as follows:

$$Cfull_i(m) = \sum_{k=0}^{m} Hfull_i(k)$$

$$Cmotion_i(m) = \sum_{k=0}^{m} Hmotion_i(k)$$

$$Cglobal_i(m) = \sum_{k=0}^{m} Hglobal_i(k)$$

From each of the three histograms above $Hfull_i$, $Hmotion_i$ and $Hglobal_i$, we also calculate three reverse cumulative histograms as follows:

$$Cfull_i^r(m) = \sum_{k=N_{full}-1}^{N_{full}-m-1} Hfull_i(k)$$

$$Cmotion_i^r(m) = \sum_{k=N_{motion}-1}^{N_{motion}-m-1} Hmotion_i(k)$$

$$Cglobal_i^r(m) = \sum_{k=N_{global}-1}^{N_{global}-m-1} Hglobal_i(k)$$

These cumulative histograms will be used in substeps 4.2 and 4.3 below.

Step 4—Estimation of Exposure $E_{i+1}$ for the Next Frame $f_{i+1}$:

To estimate this exposure $E_{i+1}$ for the next frame $f_{i+1}$, we need notably the value of the exposure for the current frame $f_i$ and the value of the preferred direction of exposure change $dir_{i+1}$ provided by the previous iteration (or by the initialization step).

Globally, there are three possible cases:
 a. The exposure $E_i$ of the current frame $f_i$ has already captured the whole scene exposure range, in which case, $E_{i+1} \leftarrow E_i$ and $dir_{i+2}$=down (since we are effectively reverting to the initialization conditions). To test whether the current exposure $E_i$ sufficiently captures the scene's dynamic range, the first and last bins of the $N_{full}$ bins of the full image histogram $Hfull_i$ are taken. For a histogram with a total number of bins $N_{full}$, the bin values $Hfull_i(0)$ and $Hfull_i(N_{full}-1)$ are tested against a bin threshold $h$. The value of this threshold, which is generally common to all frames, is typically a small percentage of the total number of pixels in the frame, for instance 1%, but could also be chosen to be zero. The current frame is considered as capturing the scene's dynamic range if the following condition is fulfilled:

$Hfull_i(0) < h$ AND $Hfull_i(N_{full}-1) < h$ b. We can find an exposure setting $E_{i+1}$ that fulfils two conditions:
    $f_{i+1}$ has sufficient overlap with $f_i$
    $f_{i+1}$ is capturing enough useful pixels
 c. There is no such exposure $E_{i+1}$, e.g because the scene irradiance distribution is bimodal and exposure $E_i$ is in the middle of the two modes, in which case we choose the biggest exposure step that we can in the given direction of exposure change while preserving sufficient exposure overlap in one of the two possible directions of exposure change.

Figure 3:
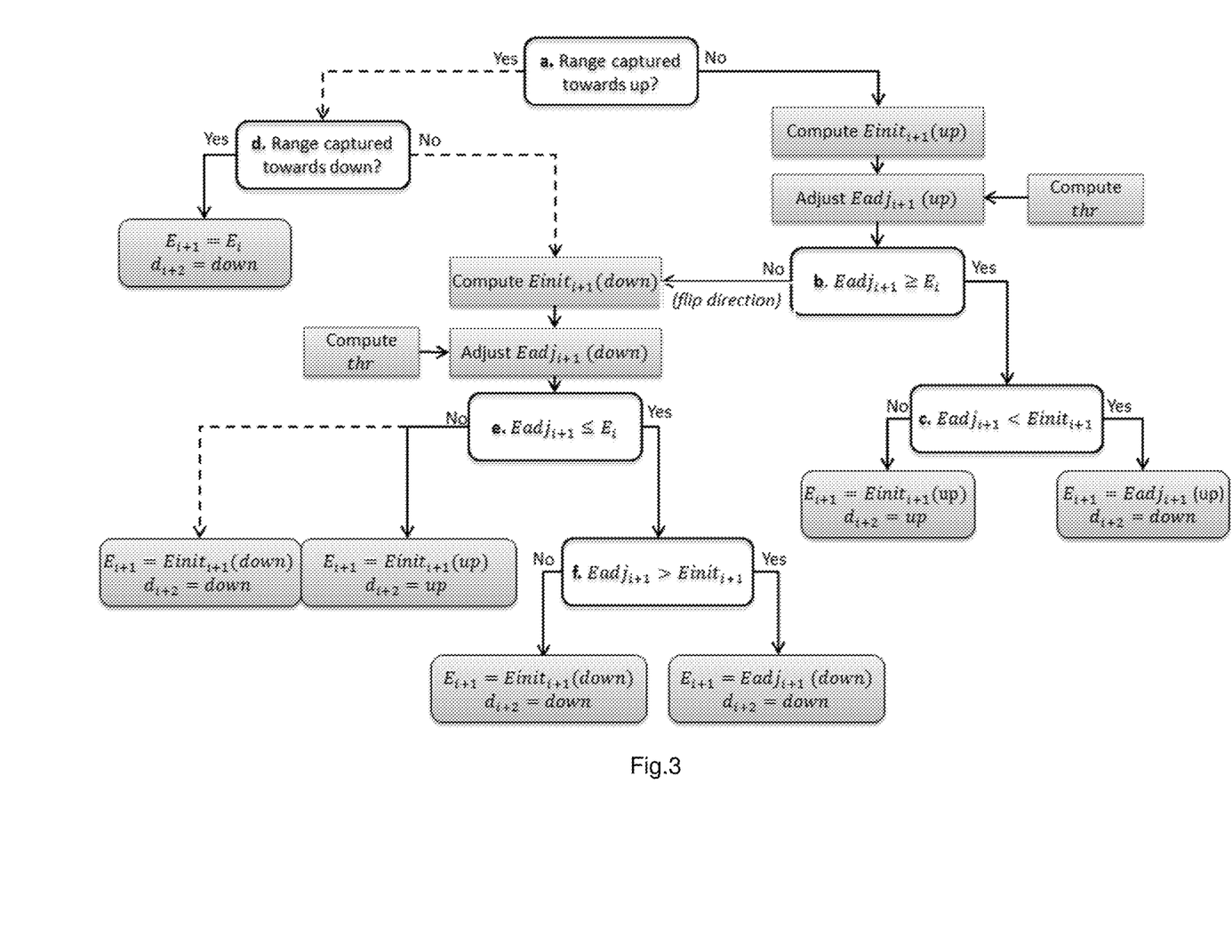
FIG. 3 is a decision tree used in this main embodiment, when the direction of exposure change for the next frame is "up", to implement the step of final estimation of exposure for this next frame and the step of determination of direction of exposure change for the following frame.
Figure 4:
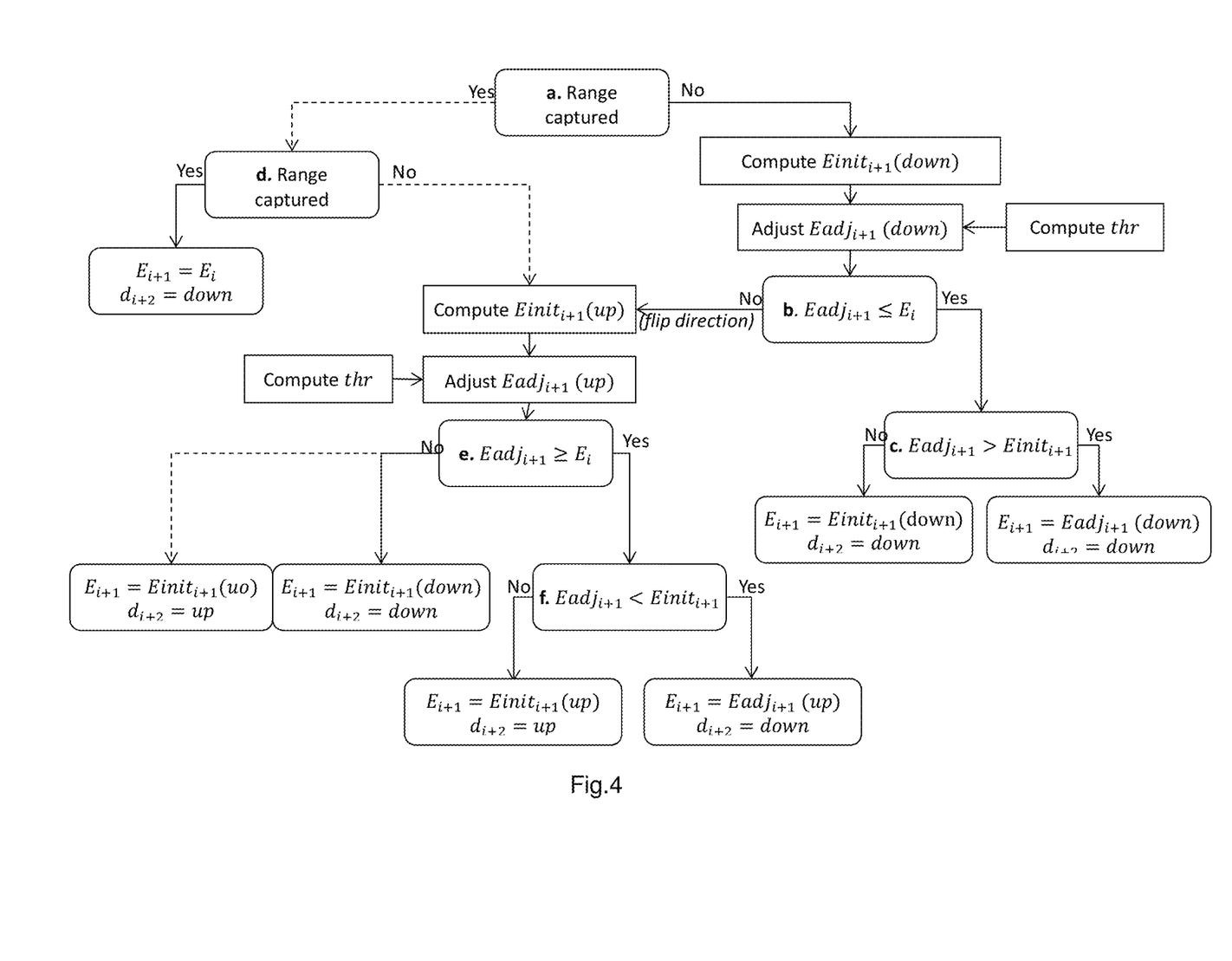
FIG. 4 is a decision tree used in this main embodiment, when the direction of exposure change for the next frame is "down", to implement the step of final estimation of exposure for this next frame and the step of determination of direction of exposure change for the following frame.

The main blocks of the decisions trees shown on FIG. 3 and FIG. 4 that lead to the estimation of an exposure $E_{i+1}$ for the next frame $f_{i+1}$ involve two previous estimations, namely an estimation of an initial exposure $Einit_{i+1}$ for the next frame $f_{i+1}$ and an estimation of an adjusted exposure $Eadj_{i+1}$ for the next frame $f_{i+1}$. These estimations are described in the substeps below.

Sub-Step 4.1—Estimation of the Initial Exposure $Einit_{i+1}$ for next Frame $f_{i+1}$:

We compute an initial exposure setting $Einit_{i+1}$ for the next frame using only $Hfull_i$ provided in step 1, and changing the exposure in direction $dir_{i+1}$, which has been computed from a previous iteration (or initialization step) according to the same process described in step 5 below for the computation of $dir_{i+2}$.

We compute a default low-threshold brightness value $Z_{low,i}$ corresponding to an under-exposed color data threshold $t_{low}$ for the current frame $f_i$, and we compute a default high-threshold brightness value $Z_{high,i}$ corresponding to an over-exposed color data threshold $t_{high}$. The thresholds $t_{low}$ and $t_{high}$ define, in relative scale, which range of brightness is useful in a frame. The values of $t_{low}$ and $t_{high}$ are generally common to all frames of a sequence to capture. If the frame sensor 110 is configured to capture 8 bit frames, we have for instance $t_{low}$=0.2 and $t_{high}$=0.9. Therefore, for such a computing, if we have $t_{low}$=0.2, then $Z_{low,i} = t_{low} \times 255 = 51$, and if we have $t_{high}$=0.9, then $Z_{high,i} = t_{high} \times 255 = 230$.

As shown below, to compute $Einit_{i+1}$ we consider under-exposed color data threshold $t_{low}$ if $dir_{i+1}$=up and over-exposed color data threshold $t_{high}$ if $dir_{i+1}$=down.

Knowing the camera response function CRF of the frame sensor 110 (see above) and the exposure time $E_i$ of the current frame $f_i$, we now compute scene irradiance values of this frame corresponding to default threshold brightness values $Z_{low,i}$ or $Z_{high,i}$ of this frame as follows:

$$I(Z_{low,i}) = \frac{CRF^{-1}(Z_{low,i})}{E_i} \qquad (3)$$

$$I(Z_{high,i}) = \frac{CRF^{-1}(Z_{high,i})}{E_i} \qquad (3')$$

where $CRF^{-1}$ is the inverse of the camera response function CRF.

Figure 5:
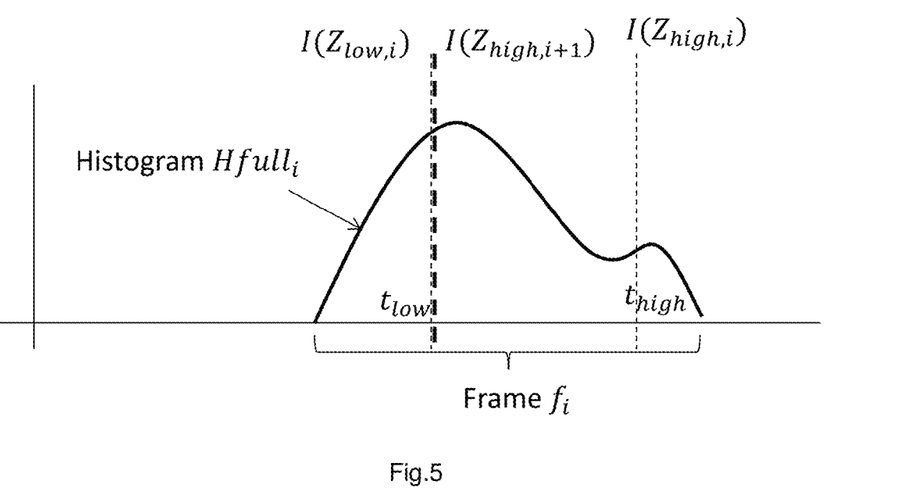
FIG. 5 illustrates an histogram of brightness values Z in a current frame $f_i$, of an iteration of the method illustrated on FIG. 2 according to a main embodiment.

FIG. 5 illustrates the distribution of brightness values Z (i.e. 0 to 255 in a 8 bit coding) in the current frame $f_i$. This distribution corresponds to only $Hfull_i$. Y-axis corresponds to pixel counts and X-axis corresponds to color data Z of pixel values. I(Z) represents a scene irradiance value captured as Z.

To compute $Einit_{i+1}$ when $dir_{i+1}$=up, the following equation illustrated on FIG. 5 should be preferably satisfied:

$$I(Z_{low,i}) = I(Z_{high,i+1}) \qquad (4)$$

Given equations (3) and (4), it follows that $$I(Z_{high,i+1}) = \frac{CRF^{-1}(Z_{low,i})}{E_i}. \qquad (5)$$

Considering the camera response function CRF again we can reformulate equation (5) based on the values corresponding to the next frame $f_{i+1}$:

$$I(Z_{high,i+1}) = \frac{CRF^{-1}(Z_{high,i+1})}{Einit_{i+1}} \qquad (6)$$

Combining (5) and (6) gives us $$\frac{CRF^{-1}(Z_{low,i})}{E_i} = \frac{CRF^{-1}(Z_{high,i+1})}{Einit_{i+1}} \qquad (7)$$

The only unknown in equation (7) is $Einit_{i+1}$ so we can solve for it, obtaining the initial exposure setting for the next frame $f_{i+1}$ according to:

$$Einit_{i+1} = \frac{CRF^{-1}(Z_{high,i+1})}{CRF^{-1}(Z_{low,i})} E_i \qquad (8)$$

In simple terms, we can compute an estimation for the exposure $Einit_{i+1}$ of the next frame $f_{i+1}$ so that for specific color values in the current and next frames $f_i$, $f_{i+1}$, we have the same scene irradiance captured. This choice of $Einit_{i+1}$ ensures that there is sufficient exposure overlap between the exposure range in the current frame $f_i$ and the next frame $f_{i+1}$, and that the next frame captures a sufficient number of pixels that were either under-exposed or over-exposed in the current frame (i.e., case 4b, above).

Similarly, still referring to the distribution of brightness values shown on FIG. 5, to compute $Einit_{i+1}$ when $dir_{i+1}$=down, the Initial Exposure $Einit_{i+1}$ for next Frame $f_{i+1}$ is estimated according to equation 8' below:

$$Einit_{i+1} = \frac{CRF^{-1}(Z_{low,i+1})}{CRF^{-1}(Z_{high,i})} E_i \qquad (8')$$

The invention is not limited to the computation of $Einit_{i+1}$ as described above. Other known methods of building HDR images without taking into account the motion may be used, notably methods using not only the thresholds $Z_{low}$ and $Z_{high}$ positioned on the brightness histogram only $H\,full_i$ as described above, but also methods using the shape of this histogram. See for instance U.S. Pat. No. 7,382,931.

Sub-Step 4.2—Estimation of the Adjusted Exposure $Eadj_{i+1}$ for the Next Frame $f_{i+1}$:

For such an estimation, we will preferably consider how many pixels of the current frame $f_i$ have colors that are over or under exposed in different situations and adjust an exposure for the next frame $f_{i+1}$ accordingly.

To determine the number of over/under exposed pixels that is acceptable for the next frame $f_{i+1}$, we preferably consider how many pixels are affected by local or global motion in the current frame $f_i$ and also whether we are measuring over or under exposure in the current frame $f_i$. Each of these cases leads to different values for a threshold of percentage of over/under exposed pixels $thr_{motion}$ within the motion region MRi, and for a threshold of percentage of over/under exposed pixels $thr_{full}$ in the full frame $f_i$ (or a threshold of percentage of over/under exposed pixels $thr_{global}$ for pixels that are not in the motion region $MR_i$). These two thresholds $thr_{motion}$ and $thr_{full}$ (or $hr_{global}$) will be used below to determine how much the next frame $f_{i+1}$ should preferably brightness-overlap with the current frame $f_i$.

We will now detail the estimation of pixels $thr_{motion}$ for the current frame $f_i$.

From the motion amplitude map $M_i$ provided in step 2 above, for each pixel location x we set a local motion index $LM_i$ as follows:

$$LM_i(x) = \begin{cases} 0, & \text{if no local motion at } x \text{ in } f_i \\ \text{motion amplitude}, & \text{if local motion at } x \text{ in } f_i \end{cases} \qquad (1)$$

A local motion map is then obtained for the current frame $f_i$.

In addition, we compute the percentage of pixels that have local motion in current frame $f_i$ as follows:

$$A_i = \frac{\text{no. of pixels in } MR_i > 0}{\text{no. of pixels in } f_i} \qquad (2)$$

A value of a minimum percentage of pixels that have local motion $A_{min}$ and a value of a minimum percentage of pixels that have local motion $A_{max}$ are set experimentally to, for instance, $A_{min}$=0.1% and $A_{max}$=1%. Those values are generally common to all frames of a sequence. To determine how the motion area $MR_i$ relates to $A_{min}$ and $A_{max}$, we simply count pixels with motion as follows.

Referring to table 1 below, if the percentage of pixels with local motion $A_i$ is below $A_{min}$, then:

for over exposure when $dir_{i+1}$=up, we set $thr_{motion}$=$thr_{over,min}$ and, for under exposure when $dir_{i+1}$=down, we set $thr_{motion}=thr_{under,min}$. Values for $thr_{over,min}$ and $thr_{under,min}$ are proposed on the first row of table 1.

If the percentage of pixels with local motion $A_i$ is above $A_{max}$, then:

for over exposure when $dir_{i+1}$=up, we set $thr_{motion}=thr_{over,max}$ and, for under exposure when $dir_{i+1}$=down, we set $thr_{motion}=thr_{under,max}$. Values for $thr_{over,max}$ and $thr_{under,max}$ are proposed on the last row of table 1.

In the third possible situation in which $A_{min}<A_i<A_{max}$, we interpolate (see middle row of table 1) the value of threshold of percentage of over/under exposed pixels $thr_{motion}$ as shown follows:

$$dA = \frac{A - A_{min}}{A_{max} - A_{min}} \quad (8)$$

If $dir_{i+1}$ = up $$thr_{motion} = (thr_{under,max} - thr_{under,min})dA + thr_{under,min} \quad (9)$$

If $dir_{i+1}$ = down $$thr_{motion} = (thr_{over,max} - thr_{over,min})dA + thr_{over,min} \quad (10)$$

TABLE 1

| Percentage of image pixels with local motion | Motion case-over/under exposure thresholds | |
|---|---|---|
| $A_{min} > A_i$    $A_{min}$ = 0.1% | $thr_{under, min}$ = 100% | $thr_{over, min}$ = 90% |
| $A_{min} < A_i < A_{max}$ | Interpolation based on Eq. 8-10 | |
| $A_{max} < A_i$    $A_{max}$ = 1% | $thr_{under, max}$ = 85% | $thr_{over, max}$ = 5% |

We will now detail the estimation of pixels $thr_{full}$ (or $thr_{global}$ according to the second embodiment) for the current frame $f_i$.

We set the threshold $thr_{full}$ (or $hr_{global}$) to the threshold $thr_{under}$ given in Table 2 if the direction $dir_{i+1}$=up, or to the threshold $thr_{over}$ given in Table 2 if the direction $dir_{i+1}$=down.

TABLE 2

| Full case-over/under exposure thresholds | |
|---|---|
| $thr_{under}$ | $thr_{over}$ |
| 92% | 20% |

This process is repeated for both cumulative histograms.

The value of the threshold $thr_{motion}$ for the percentage of over/under exposed pixels within the motion region MRi is variable from frame to frame, notably as it may be computed according to eq. 10, and therefore evaluated specifically for each frame. This value will change depending on how much motion is in the frame.

After we obtain as explained above the values of the thresholds of percentage of over/under exposed pixels $thr_{motion}$ for the motion region $MR_i$ of the current frame $f_i$, and $thr_{full}$ for all pixels of the current frame $f_i$, (or $thr_{global}$ for pixels not belonging to the motion region), we select two cumulative histograms among the above described for subsequent calculations. If an increase of the exposure time is preferred for the next frame (i.e. $dir_{i+1}$=up), then we select preferably $Cfull_i^r$ and $Cmotion_i^r$. In an alternative embodiment, we could choose $Cglobal_i^r$ and $Cmotion_i^r$, to avoid counting pixels double (as outlined above).

If a decrease of the exposure time is preferred, i.e. $dir_{i+1}$=down, then we select preferably $Cfull_i$ and $Cmotion_i$. In an alternative embodiment, we could choose $Cglobal_i$ and $Cmotion_i$, to avoid counting pixels double (as outlined above).

This process preferably selects two cumulative histograms, one for the motion region, and one for either the full image, or the full image minus the motion region $MR_i$. We have also determined above the values for two corresponding thresholds: $thr_{motion}$ calculated according to equations 9 and 10 above is implicated in the following calculation on $Cmotion_i$ (resp. $Cmotion_i^r$), and $thr_{full}$ set according to table 2 in dependence to $dir_{i+1}$ is implicated in the following calculation on either $Cfull_i$ (resp. $Cfull_i^r$) or $Cglobal_i$ (resp. $Cglobal_i^r$), dependent on choice of embodiment.

Figure 6:
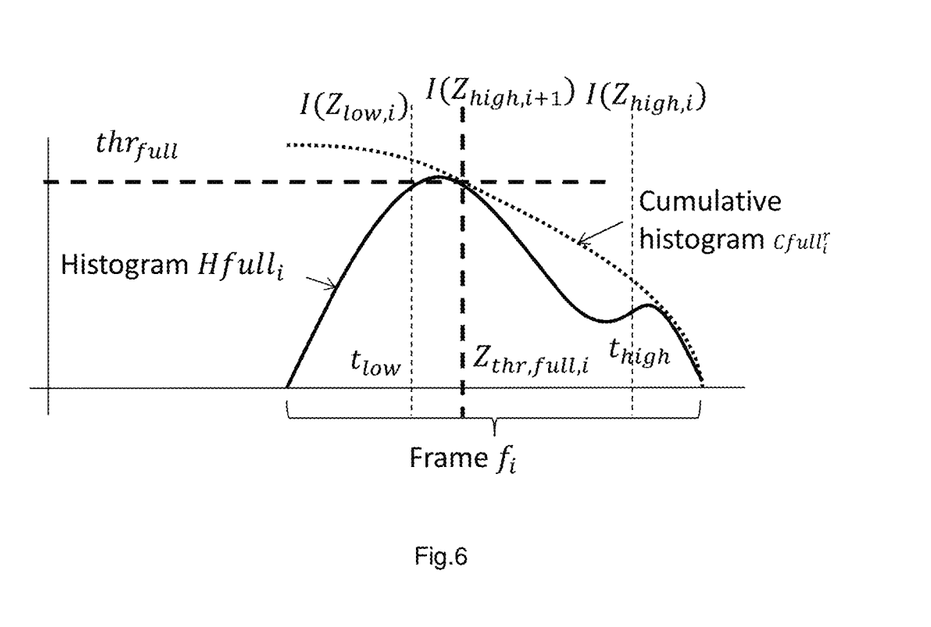
FIG. 6 illustrates the same histogram of brightness values Z as FIG. 5, with a cumulative histogram in dotted line.

FIG. 6 illustrates the same distribution of brightness/intensity values Z (i.e. 0 to 255 in a 8 bit coding) in the current frame $f_i$, as FIG. 5. On a curve in dotted line, FIG. 6 also illustrates selected reverse cumulative distributions. I(Z) represents a scene irradiance value captured as Z. Referring to this FIG. 6, we determine the value of an adjusted threshold brightness $Z_{thr,full,i}$ corresponding to the above threshold $thr_{full}$ as follows: on the cumulative histogram $Cfull_i$ (resp. $Cfull_i^r$) in dotted line, we find the point where the y-axis (i.e. the pixel count) is equal to $thr_{full}$ and the projection of this point on the x-axis gives the value of $Z_{thr,full,i}$.

When this process is applied to the cumulative histogram $Cfull_i$ (resp. $Cfull_i^r$ (or $Cglobal_i$ (resp. $Cglobal_i^r$)), the value of $Z_{thr,full,i}$ is obtained. This process is repeated for the cumulative histogram $Cmotion_i$ (resp. $Cmotion_i^r$) to obtain $Z_{thr,motion,i}$.

Then, a final adjusted threshold brightness value $Z_{thr,i}$ is set to $Z_{thr,motion,i}$ if and only if:

$$C_{motion,i}(Z_{thr,motion,i}) \leq thr_{motion}$$

$$C_{full,i}(Z_{thr,motion,i}) \leq thr_{full}$$

Alternatively, the final adjusted threshold brightness value $Z_{thr,i}$ is set to $Z_{thr,full,i}$ if and only if:

$$C_{motion,i}(Z_{thr,full,i}) \leq thr_{motion}$$

$$C_{thr,full,i}(Z_{thr,full,i}) \leq thr_{full}$$

Once we have this adjusted threshold brightness value $Z_{thr,i}$, we estimate the adjusted exposure $Eadj_{i+1}$ for the next frame $f_{i+1}$ in the same way we have estimated above $Einit_{i+1}$ in Equations 3 to 7, in which we replace $Z_{low,i}$ by $Z_{thr,i}$ and $Einit_{i+1}$ by $Eadj_{i+1}$.

Sub-Step 4.3—Final Estimation of the Exposure $E_{i+1}$ for the Next Frame $f_{i+1}$:

If $dir_{i+1}$=up, we follow the decision tree shown on FIG. 3 to obtain a final estimation of the exposure $E_{i+1}$ for the next frame $f_{i+1}$. If $dir_{i+1}$=down, we follow the decision tree shown on FIG. 4 to obtain a final estimation of the exposure $E_{i+1}$ for the next frame $f_{i+1}$. According to these decision trees, the conclusion, is either $E_{i+1}=Einit_{i+1}$, or $E_{i+1}=Eadj_{i+1}$. Note that these decision trees take into account the exposure Ei of the current frame $f_i$.

Step 5—Determination of the Preferred Direction of Exposure Change for the Following Frame $f_{i+2}$:

This direction $dir_{i+2}$ determines if the "following" frame $f_{i+2}$ should be captured with a longer ("up") or shorter ("down") exposure time than the exposure $E_{i+1}$ for the "next" frame $f_{i+1}$. The direction $dir_{i+2}$ in which the exposure for the following frame $f_{i+2}$ should be preferably changed (up or down) at the next iteration is determined according to the same decision trees as those used for sub-step 4.3. See again FIGS. 3 and 4.

Step 6—Capture of the Next Frame $f_{i+1}$:

The sensor 110 receives data related to the exposure $E_{i+1}$ as adjusted by the processor 120 in step 4 above. Then, the sensor captures the next frame $f_{i+1}$ under this exposure $E_{i+1}$. The image data related to this captured frame $f_{i+1}$ are then transferred to the memory 130 to be stored.

Successive Iterations of Steps 1 to 6

After the first iteration of steps 1 to 6 above, other successive iterations of steps 1 to 6 are similarly performed, up to the end of the captures.

From iteration to iteration, successive frames $f_0$, $f_1$, $f_2$, ..., $f_{i-1}$, $f_i$, $f_{i+1}$, ..., $f_{Q-1}$ imaging the same scene under respective exposures $E_0$, $E_1$, $E_2$, ..., $E_{i-1}$, $E_i$, $E_{i+1}$, ..., $E_{Q-1}$ are stored in the memory 130, where Q is the total number of frames of a sequence.

Post-Processing: Generating a Sequence of HDR Images of the Scene

After the capture of Q frames as described above, a post-processing step is applied by the processor 120 such as to group those frames into series of successive frames having different exposures, and to merge in a manner known per se the frames of each series into an HDR image of the scene. Preferably, each series comprises two successive frames and each frame belongs to two series, such that the second frame of a first series is the first frame of a second series following the first series.

The generation of each HDR image from the merging of the frames of a series is preferably performed using the method described in the article entitled "Patch-based high dynamic range video" by Nima Khademi Kalantari et al., published in 2013 in *ACM Trans. Graph.*, 32(6), page 202.

A video sequence of HDR images of the scene is then obtained.

In a variant, the generation of HDR images from successive frames as described above can be performed as soon as image data concerning these frames are available in the memory 130.

ADVANTAGE OF THE INVENTION

The method according to the invention has the following advantages:

motion artifacts are minimized in generated HDR video sequences while the dynamic range of these sequence is maximized;

almost every frame captured in the online part of the method, i.e. in the iterations of steps 1 to 6 above, lead to an HDR frame after post-processing, removing the need for high frame rate cameras as in other methods of generating HDR video sequences;

capture of the minimal necessary number of exposures for a given HDR image, so that if a scene does not need many exposures, they will not be captured;

the method is particularly designed for mobile devices with their limited processing capabilities.

It is to be understood that the invention may be implemented in various forms of hardware, software, firmware, special purpose processors, or combinations thereof. The invention may be notably implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

While the present invention is described with respect to particular examples and preferred embodiments, it is understood that the present invention is not limited to these examples and embodiments. The present invention as claimed therefore includes variations from the particular examples and preferred embodiments described herein, as will be apparent to one of skill in the art. While some of the specific embodiments may be described and claimed separately, it is understood that the various features of embodiments described and claimed herein may be used in combination. Reference numerals appearing in the claims are by way of illustration only and shall have no limiting effect on the scope of the claims.

The invention claimed is:

1. A method for generating an HDR image of a scene, wherein a current frame ($f_i$) imaging said scene has been captured under a current exposure ($E_i$) and a previous frame ($f_{i+1}$) imaging said scene has been captured before said current frame ($f_i$), said method comprising:
    setting an exposure ($E_{i+1}$) for a next frame ($f_{i+1}$) as a function of said current exposure ($E_i$), of a first brightness distribution (Hfull$_i$) of colors of pixels of said current frame ($f_i$) and of a second brightness distribution (Hmotion$_i$) of colors of these pixels weighted by motion of these pixels, wherein said motion is evaluated for these pixels in comparison with said previous frame ($f_i$),
    capturing said next frame ($f_{i+1}$) under said set exposure ($E_{i+1}$),
    merging said next frame ($f_{i+1}$) with at least said current frame ($f_i$) into an HDR image.

2. Method for generating an HDR image according to claim 1, wherein said exposure ($E_{i+1}$) for the next frame ($f_{i+1}$) is set as a function also of a preferred direction (dir$_{i+1}$) of exposure change for said current frame ($f_{i+1}$).

3. Method for generating an HDR image according to claim 2 comprising the determination of a preferred direction (dir$_{i+2}$) of exposure change for a frame ($f_{i+2}$) following the next frame ($f_{i+1}$).

4. Method for generating an HDR image according to claim 1, wherein said setting of an exposure ($E_{i+1}$) for the next frame ($f_{i+1}$) comprises an estimation of an initial exposure (Einit$_{i+1}$) based on said first brightness distribution (Hfull$_i$) but not based on said second brightness distribution (Hmotion$_i$), an estimation of an adjusted exposure (Eadj$_{i+1}$) based on said second brightness distribution (Hmotion$_i$), and a final estimation of said exposure ($E_{i+1}$) for the next frame ($f_{i+1}$) adapted to choose between said initial exposure (Einit$_{i+1}$) and said adjusted exposure (Eadj$_{i+1}$) as a value for said exposure ($E_{i+1}$) for the next frame ($f_{i+1}$).

5. A HDR image capture device comprising a frame sensor configured to capture successive frames imaging a scene, notably to capture a current frame ($f_i$) under a current exposure ($E_i$) and a previous frame ($f_{i+1}$), and a processor configured to:

set an exposure ($E_{i+1}$) for a next frame ($f_{i+1}$) as a function of said current exposure ($E_i$), of a first brightness distribution ($Hfull_i$) of colors of pixels of said current frame ($f_i$) and of a second brightness distribution ($Hmotion_i$) of colors of these pixels weighted by motion of these pixels, wherein said motion is evaluated for these pixels in comparison with said previous frame ($f_{i+1}$), trigger the capture of said next frame ($f_{i+1}$) under said set exposure ($E_{i+1}$) by said frame sensor, merge said next frame ($f_{i+1}$) with at least said current frame ($f_i$) into an HDR image.

6. HDR image capture device according to claim 5, wherein said processor is also configured to set said exposure ($E_{i+1}$) for the next frame ($f_{i+1}$) as a function also of a preferred direction ($dir_{i+1}$) of exposure change for said current frame ($f_{i+1}$).

7. HDR image capture device according to claim 6, wherein said processor is also configured to determine a preferred direction ($dir_{i+2}$) of exposure change for a frame ($f_{i+2}$) following the next frame ($f_{i+1}$).

8. HDR image capture device according to claim 5, wherein said processor is also configured such that said setting of an exposure ($E_{i+1}$) for the next frame ($f_{i+1}$) comprises an estimation of an initial exposure ($Einit_{i+1}$) based on said first brightness distribution ($Hfull_i$) but not based on said second brightness distribution ($Hmotion_i$), an estimation of an adjusted exposure ($Eadj_{i+1}$) based on said second brightness distribution ($Hmotion_i$), and a final estimation of said exposure ($E_{i+1}$) for the next frame ($f_{i+1}$) adapted to choose between said initial exposure ($Einit_{i+1}$) and said adjusted exposure ($Eadj_{i+1}$) as a value for said exposure ($E_{i+1}$) for the next frame ($f_{i+1}$).

* * * * *